(12) United States Patent
Zhong et al.

(10) Patent No.: US 10,567,757 B2
(45) Date of Patent: Feb. 18, 2020

(54) DYNAMIC REFERENCE PICTURE RECONSTRUCTION

(71) Applicant: Agora Lab, Inc., Santa Clara, CA (US)

(72) Inventors: Sheng Zhong, Santa Clara, CA (US); Bin Zhao, Santa Clara, CA (US)

(73) Assignee: Agora Lab, Inc., Santa Clara, CA (US)

( * ) Notice: Subject to any disclaimer, the term of this patent is extended or adjusted under 35 U.S.C. 154(b) by 0 days.

(21) Appl. No.: 15/993,868

(22) Filed: May 31, 2018

(65) Prior Publication Data

US 2019/0373254 A1    Dec. 5, 2019

(51) Int. Cl.

| *H04N 19/105* | (2014.01) |
| *H04N 19/164* | (2014.01) |
| *H04N 19/174* | (2014.01) |
| *H04N 19/65*  | (2014.01) |

(52) U.S. Cl.
CPC ......... *H04N 19/105* (2014.11); *H04N 19/164* (2014.11); *H04N 19/174* (2014.11); *H04N 19/65* (2014.11)

(58) Field of Classification Search
CPC .. H04N 19/105; H04N 19/164; H04N 19/174; H04N 19/65
USPC ................................................... 375/240.12
See application file for complete search history.

(56) References Cited

U.S. PATENT DOCUMENTS

| 2008/0247463 | A1  | 10/2008 | Buttimer et al. | |
| 2010/0195742 | A1* | 8/2010  | Wu ..................... | H03M 7/4006 375/240.27 |
| 2012/0140833 | A1* | 6/2012  | Takada ................ | H04N 19/20 375/240.26 |
| 2013/0058405 | A1* | 3/2013  | Zhao ................... | H04N 19/176 375/240.12 |
| 2013/0271571 | A1* | 10/2013 | Wu ..................... | H04N 13/0048 348/43 |
| 2015/0016531 | A1* | 1/2015  | Hannuksela .......... | H04N 19/70 375/240.16 |

FOREIGN PATENT DOCUMENTS

EP            763944 A2    3/1997

OTHER PUBLICATIONS

Fukunaga S et al: "Error resilient video coding controlled by backward channel signaling", Signal Processing. Image Communication, Elsevier Science Publishers, Amsterdam, NL, vol. 14, No. 6-8, May 1, 1999 (May 1, 1999), pp. 531-540, XP004165393, ISSN: 0923-5965, DOI: 10.1016/S0923-5965 (99) 00005-3.

(Continued)

*Primary Examiner* — Jeffery A Williams
(74) *Attorney, Agent, or Firm* — Young Basile Hanlon & MacFarlane, P.C.

(57) ABSTRACT

A method for encoding a video stream, including encoding, by a processor, a first slice of a first picture of the video stream; receiving, from a decoder, a feedback message indicative of having received the first slice of the first picture; and in response to receiving the feedback message indicative of having received the first slice of the first picture, updating a dynamic reference picture (DRR) with the first slice of the first picture, wherein the first slice of the first picture replaces the first slice of a second picture in the dynamic reference picture, and the first slice of the first picture and the first slice of the second picture are co-located.

20 Claims, 7 Drawing Sheets

(56) References Cited

OTHER PUBLICATIONS

Pat Mulroy et al: "Windowed Reference Picture Selection for H.264 Transmission Error Recovery", 26. Picture Coding Symposium; Jul. 11, 2007-Sep. 11, 2007; Libson, Nov. 7, 2007 (Nov. 7, 2007), XP030080494.
Athanasios Leontaris et al: "Multiple Reference Motion Compensation: A Tutorial Introduction and Survey", Foundations and Trends in Signal Processing, Now Publishers, Hanover, Mass., USA. vol. 2, No. 4, Jan. 1, 2008 (Jan. 1, 2008), pp. 247-364, XP007917565, ISSN: 1932-8354, DOI: 10.1561/2000000019.
Extended European search report issued in corresponding European application No. 19160633.4 dated Sep. 17, 2019.

* cited by examiner

US 10,567,757 B2

DYNAMIC REFERENCE PICTURE RECONSTRUCTION

TECHNICAL FIELD

This disclosure relates to video coding, and in particular to packet loss resilient video coding using dynamic reference picture reconstruction.

BACKGROUND

Data compression techniques have been developed over the last several decades to reduce the large bandwidth needed by transmission of media (audio, video, or multimedia) data. For example, reference pictures have been used in modern video encoding standards for motion estimation (ME) and motion compensation (MC) to reduce inter-frame redundancy. One side effect of data compression is that the compressed media data is sensitive to data loss or noise, which can happen in best-effort networks. For example, in some cases, network jitter can cause a packet to be lost or overdue for arrival to a decoder, which results in loss of a picture or part of the picture at the decoder. Furthermore, the lost packet can include information to be used (e.g., as part of a reference picture) to decode other pictures, which will cause further harm to the decoding process. As end user devices and network environments become more diversified, reliable media data transmission over noisy networks becomes more challenging.

SUMMARY

Disclosed herein are implementations of methods, apparatuses, and systems for packet loss resilient video coding using dynamic reference picture reconstruction.

In one aspect, a method for encoding a video stream is disclosed. The method includes encoding, by a processor, a first slice of a first picture of the video stream; receiving, from a decoder, a feedback message indicative of having received the first slice of the first picture; and in response to receiving the feedback message indicative of having received the first slice of the first picture, updating a dynamic reference picture (DRR) with the first slice of the first picture, wherein the first slice of the first picture replaces the first slice of a second picture in the DRR, and the first slice of the first picture and the first slice of the second picture are co-located.

In another aspect, a method for decoding an encoded video stream is disclosed. The method includes receiving, from an encoder, data associated with a first slice of a first picture of the encoded video stream; based on a determination that all data required for decoding the first slice of the first picture has been received, sending, to the encoder, a feedback message indicative of having received the first slice of the first picture, and decoding, by a processor, the first slice of the first picture; and updating a dynamic reference picture (DRR) with the first slice of the first picture, wherein the first slice of the first picture replaces the first slice of a second picture in the DRR, and the first slice of the first picture and the first slice of the second picture are co-located.

In another aspect, an apparatus for decoding an encoded video stream is disclosed. The apparatus includes a non-transitory memory and a processor, wherein the non-transitory memory includes instructions executable by the processor to receive, from an encoder, data associated with a first slice of a first picture of the encoded video stream; based on a determination that all data required for decoding the first slice of the first picture has been received, send, to the encoder, a feedback message indicative of having received the first slice of the first picture, and decode the first slice of the first picture from the encoded video stream; and update a dynamic reference picture (DRR) with the first slice of the first picture, wherein the first slice of the first picture replaces the first slice of a second picture in the DRR, and the first slice of the first picture and the first slice of the second picture are co-located.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
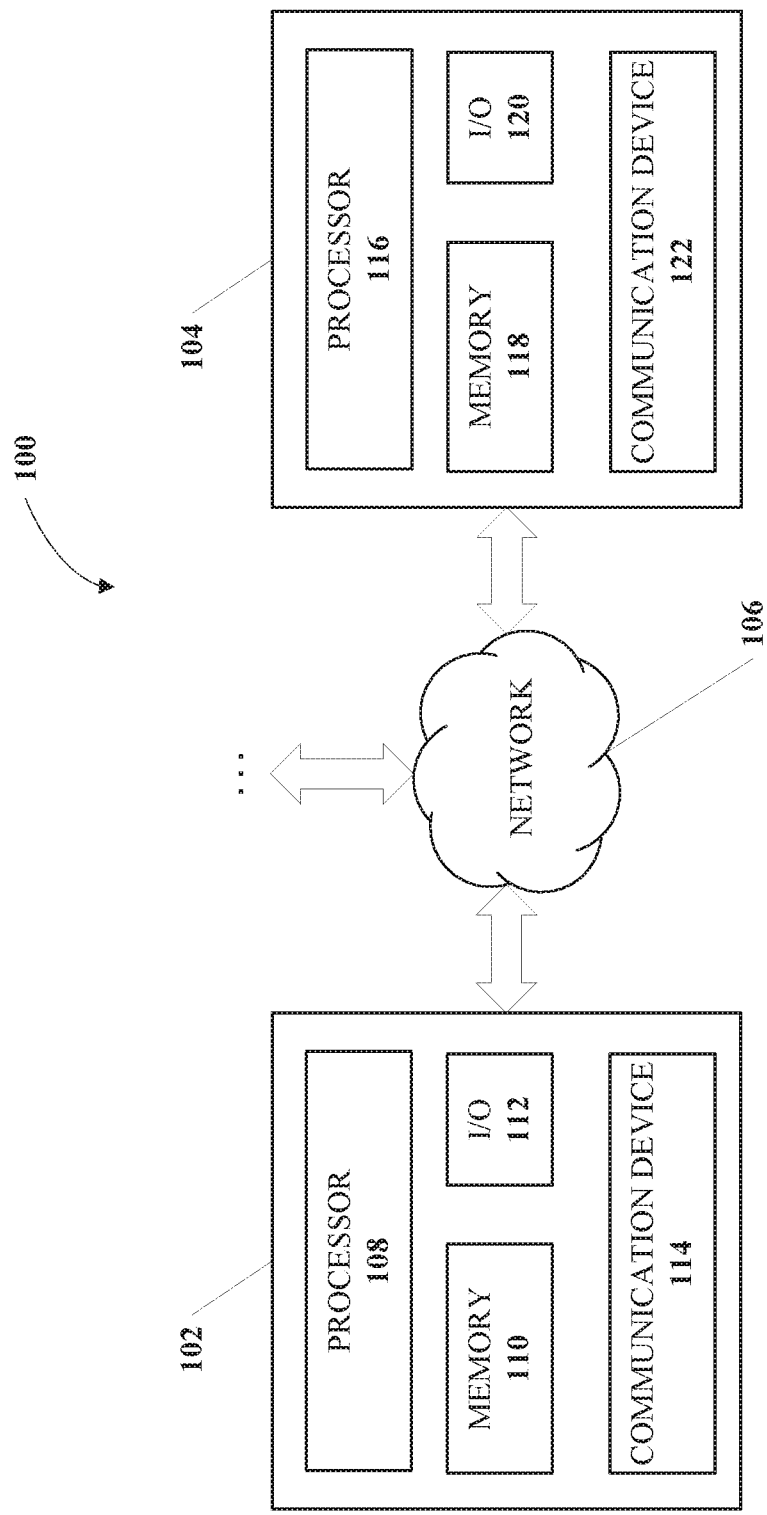
FIG. 1 is a diagram of an example system for media data transmission according to implementations of this disclosure.

Online multimedia data sharing, such as a video conference call, a live-stream video broadcasting, or an Internet phone service, requires media data transmission with efficiency and fidelity. The media data can include audio data, video data, or any multimedia data including an audio sequence or a video sequence. Typically, media data can be stored in its original form or converted to form a video stream. The video stream can be encoded (or "compressed") into a compressed video stream (e.g., a video bitstream) for transmission over a network. The compressed video stream can be transmitted over a network in data packets (or "packets" for simplicity).

When encoding the video stream (also referred to as a "video sequence"), a picture of the video stream can be encoded using motion estimation (ME) and motion compensation (MC). For example, a picture can be decoded using another picture as a reference (referred to as a "reference picture"). The reference picture can be an I-picture (a picture coded without referencing another picture), or a P-picture (a picture coded using another picture as a reference). During encoding and decoding, the picture can be divided or segmented into one or more slices. A slice can include one or more blocks. In some instances, ME and MC can be performed within each slice without relying on other slices in the same picture. As a result, when a slice is lost, other slices in the same picture are not affected.

According to implementations of this disclosure, a decoder receives a new slice from a picture, and sends a feedback message to an encoder indicating that the new slice has been received. When the feedback message arrives at the encoder, the encoder replaces an old slice in a dynamic reference picture (DRR) with the new slice (e.g., a reconstructed slice from the new slice), so that the updated DRR can be used as a reference picture for encoding subsequent pictures. The new slice and the old slice can be, for example, co-located slices. It will take some time for the feedback message to arrive, especially when the network condition is jittery. Before receiving the feedback message, without knowing whether the new slice has safely arrived at the decoder, the encoder will not use it as reference. After receiving the feedback message, the encoder can update the DRR, which can be used as reference for encoding a new picture.

Likewise, after the new slice is decoded, the decoder can update the DRR with the newly decoded slice after sending the feedback message, but will have to wait until the encoder receives the feedback message, which may take some time. When using the updated DRR as reference for encoding the new picture, the reference information can be indicated by the encoder in, for example, a slice header or supplemental enhancement information (SEI) of the new picture. Upon receiving the new picture, the decoder can tell from the slice header or the SEI that the DRR needs to be updated, which will be updated with the previously decoded new slice received and acknowledged by the decoder in the feedback message. The new DRR is used for decoding the new picture.

A slice can be included in one packet or divided into multiple packets. By using slice-level feedback messages to update the DRR of subsequent pictures, and without requiring that the whole picture to be received, the dynamic reference picture reconstruction can increase packet loss resilience under jittery network conditions. The dynamic reference picture reconstruction techniques described in this disclosure can introduce a noticeable improvement in performance, bits savings, and mitigating effects on packet loss. For example, even when only one slice is received for a certain picture, that slice can still be used to update the DRR.

It should be noted that the applications and implementations of this disclosure are not limited to the examples, and alternations, variations, or modifications of the implementations of this disclosure can be achieved for any computation environment. Details of the disclosed methods, apparatus, and systems will be set forth below after an overview of the system and coding structures.

FIG. 1 is a diagram of an example system 100 for media data transmission according to implementations of this disclosure. As discussed above, the media data can include audio data, video data, or any multimedia data including an audio sequence or a video sequence. As shown in FIG. 1, the system 100 can include multiple apparatuses and networks, such as an apparatus 102, an apparatus 104, and a network 106. The apparatuses can be implemented by any configuration of one or more computers, such as a microcomputer, a mainframe computer, a supercomputer, a general-purpose computer, a special-purpose/dedicated computer, an integrated computer, a database computer, a remote server computer, a personal computer, a laptop computer, a tablet computer, a cell phone, a personal data assistant (PDA), a wearable computing device, or a computing service provided by a computing service provider, for example, a web host or a cloud service provider. In some implementations, the computing device can be implemented in the form of multiple groups of computers that are at different geographic locations and can communicate with one another, such as by way of a network. While certain operations can be shared by multiple computers, in some implementations, different computers are assigned to different operations. In some implementations, the system 100 can be implemented using general-purpose computers/processors with a computer program that, when executed, carries out any of the respective methods, algorithms, and/or instructions described herein. In addition, or alternatively, for example, special-purpose computers/processors including specialized hardware can be utilized for carrying out any of the methods, algorithms, or instructions described herein.

The apparatus 102 can have an internal configuration of hardware including a processor 108 and a memory 110. The processor 108 can be any type of device or devices capable of manipulating or processing information. In some implementations, the processor 108 can include a central processor (e.g., a central processing unit or CPU). In some implementations, the processor 108 can include a graphics processor (e.g., a graphics processing unit or GPU). In some implementations, the processor 108 can include a special dedicated hardware accelerating processor. Although the examples herein can be practiced with a single processor as shown, advantages in speed and efficiency can be achieved using more than one processor. For example, the processor 108 can be distributed across multiple machines or devices (each machine or device having one or more processors) that can be coupled directly or connected via a network (e.g., a local area network). The memory 110 can include any transitory or non-transitory device or devices capable of storing codes and data that can be accessed by the processor (e.g., via a bus). The memory 110 herein can be a random-access memory (RAM) device, a read-only memory (ROM) device, an optical/magnetic disc, a hard drive, a solid-state drive, a flash drive, a security digital (SD) card, a memory stick, a compact flash (CF) card, or any combination of any suitable type of storage device. In some implementations, the memory 110 can be distributed across multiple machines or devices, such as in the case of a network-based memory or cloud-based memory. The memory 110 can include data, an operating system and applications. The data can include any data for processing (e.g., an audio stream, a video stream, or a multimedia stream). The applications can include programs that permit the processor 108 to implement instructions to generate control signals for performing functions of the methods in the following description.

In some implementations, in addition to the processor 108 and the memory 110, the apparatus 102 can also include a secondary (e.g., external) storage device (not shown). When present, the secondary storage device can provide additional memory when high processing needs exist. The secondary storage device can be a storage device in the form of any suitable non-transitory computer-readable medium, such as a memory card, a hard disk drive, a solid-state drive, a flash drive, or an optical drive. Further, the secondary storage device can be a component of the apparatus 102 or can be a shared device accessible via a network. In some implementations, the application in the memory 110 can be stored in whole or in part in the secondary storage device and loaded into the memory 110 as needed for processing.

In addition to the processor 108 and the memory 110, the apparatus 102 can include input/output (I/O) devices. For example, the apparatus 102 can include an I/O device 112. The I/O device 112 can be implemented in various ways, for example, it can be a display that can be coupled to the apparatus 102 and configured to display a rendering of graphics data. The I/O device 112 can be any device capable of transmitting a visual, acoustic, or tactile signal to a user, such as a display, a touch-sensitive device (e.g., a touchscreen), a speaker, an earphone, a light-emitting diode (LED) indicator, or a vibration motor. The I/O device 112 can also be any type of input device either requiring or not requiring user intervention, such as a keyboard, a numerical keypad, a mouse, a trackball, a microphone, a touch-sensitive device (e.g., a touchscreen), a sensor, or a gesture-sensitive input device. If the I/O device 112 is a display, for example, it can be a liquid crystal display (LCD), a cathode-ray tube (CRT), or any other output device capable of providing a visible output to an individual. In some cases, an output device can also function as an input device—a touchscreen display configured to receive touch-based input, for example.

The I/O device 112 can alternatively or additionally be formed of a communication device for transmitting signals and/or data. For example, the I/O device 112 can include a wired means for transmitting signals or data from the apparatus 102 to another device. For another example, the I/O device 112 can include a wireless transmitter or receiver using a protocol compatible to transmit signals from the apparatus 102 to another device or to receive signals from another device to the apparatus 102.

In addition to the processor 108 and the memory 110, the apparatus 102 can optionally include a communication device 114 to communicate with another device. Optionally, the communication can be via a network 106. The network 106 can be one or more communications networks of any suitable type in any combination, including, but not limited to, networks using Bluetooth communications, infrared communications, near field connections (NFCs), wireless networks, wired networks, local area networks (LANs), wide area networks (WANs), virtual private networks (VPNs), cellular data networks, or the Internet. The communication device 114 can be implemented in various ways, such as a transponder/transceiver device, a modem, a router, a gateway, a circuit, a chip, a wired network adapter, a wireless network adapter, a Bluetooth adapter, an infrared adapter, an NFC adapter, a cellular network chip, or any suitable type of device in any combination that is coupled to the apparatus 102 to provide functions of communication with the network 106.

Similar to the apparatus 102, the apparatus 104 includes a processor 116, a memory 118, an I/O device 120, and a communication device 122. The implementations of elements 116-122 of the apparatus 104 can be similar to the corresponding elements 108-114 of the apparatus 102. For example, the apparatus 102 can be used as a decoding apparatus (referred to as a "decoder"), and the apparatus 104 can be used as an encoding device (referred to as an "encoder"), or vice versa. The apparatus 102 can communicate with the apparatus 104 via the network 106. The apparatuses 102 and 104 can also communicate with other apparatuses (not shown) connected to the network 106. It should be noted that parts or components of the coding devices (e.g., apparatuses 102 and 104) and systems can include elements not limited to those shown in FIG. 1, and can include more or fewer parts, components, and hardware or software modules for performing various functions in addition or related to encoding and decoding using dynamic reference picture reconstruction.

The apparatuses 102 and 104 (and any algorithms, methods, instructions, etc., stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors, or any other suitable circuit. In this disclosure, the term "processor" should be understood as encompassing any the foregoing, either singly or in combination. The terms "signal," "data," and "information" are used interchangeably. Further, portions of the apparatuses 102 and 104 do not necessarily have to be implemented in the same manner.

It should be noted that parts or components of the coding devices implementing the dynamic reference picture reconstruction (e.g., apparatuses 102 and 104) and systems can include elements not limited to those shown in FIG. 1. Without departing from the scope of this disclosure, the coding devices and systems can include more or fewer parts, components, and hardware or software modules for performing various functions in addition or related to encoding and decoding.

Figure 2:
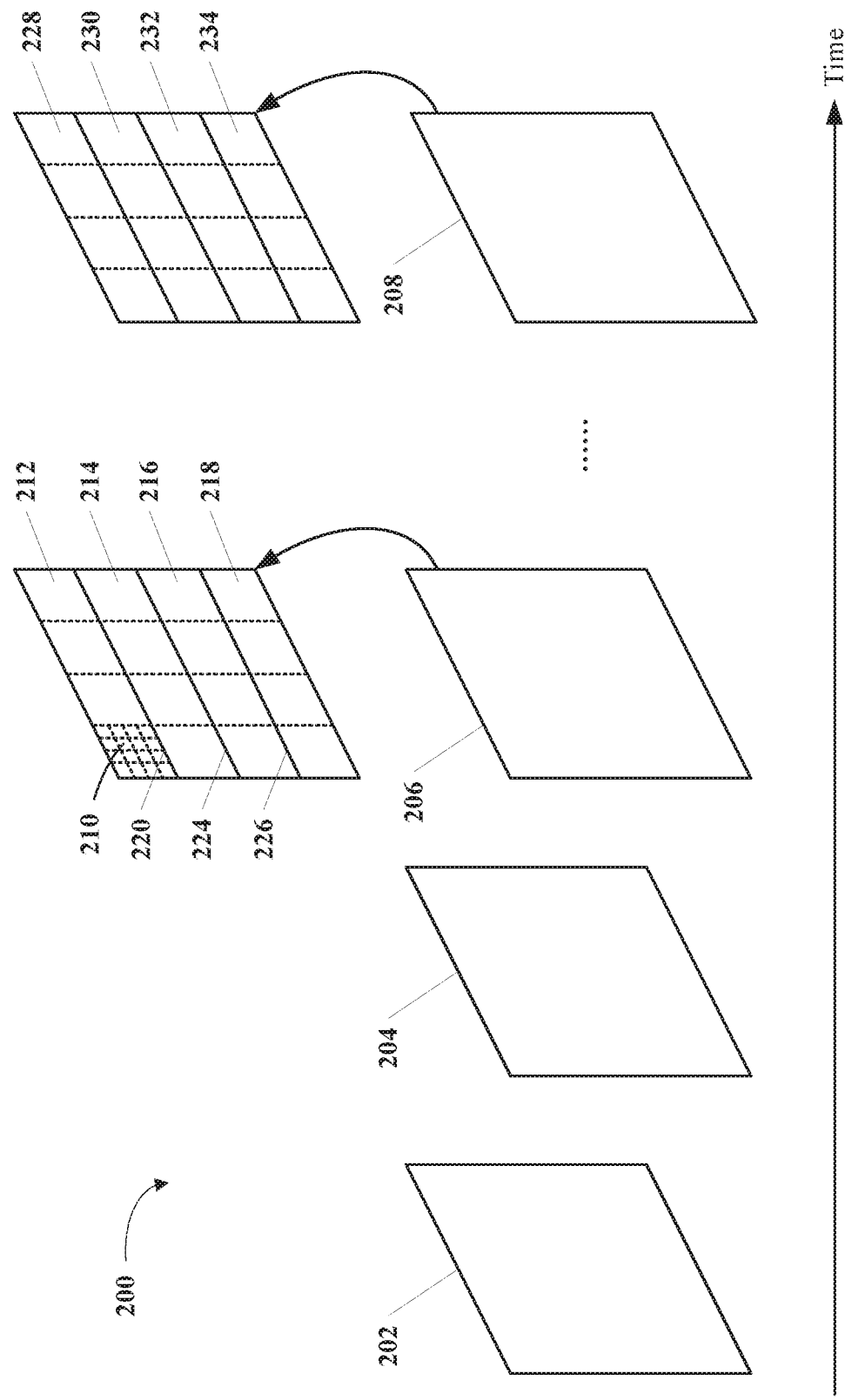
FIG. 2 is a diagram of example structures of a video stream.

FIG. 2 shows example pictures of a video stream 200. The video stream 200 can include a series of pictures along the timeline, including pictures 202-208. For example, the picture 208 can be the current picture in the coding process. The reference pictures for the picture 208 can be one or more of the pictures 206, 204, 202, or another picture (not shown) coded before the picture 208.

Each picture of the video stream 200 can be divided into multiple processing units. In some video coding standards, the processing units are referred to as "macroblocks" or "coding tree blocks" (CTBs). In some implementations, each processing unit can be further divided into one or more processing sub-units, in which the processing sub-units are referred to as "blocks" or "coding units" (CUs). The size and shape of the processing units and sub-units can be any size, such as 8×8, 8×16, 16×16, 32×32, 64×64, or any arbitrary shape. Typically, when a region has more details, the processing units and sub-units tend to be smaller in size. For ease of explanation without causing ambiguity, the processing units and sub-units are referred to as "blocks" hereinafter unless explicitly described otherwise. For example, in FIG. 2, the picture 206 is shown to have 16×16 blocks, including a block 210. The boundaries of the blocks are shown in dotted lines.

In some implementations, the blocks can be grouped, forming a special region or partition of the picture. In other words, the picture can be divided into one or more regions or partitions, and each region or partition can include one or more blocks. Such regions or partitions can be referred to as "slices," "tiles," or another name specific to certain video coding standards. For ease of explanation without causing ambiguity, such regions or partitions are referred to as "slices" hereinafter unless explicitly described otherwise herein. For example, the picture 206 can be divided into four slices 212-218, each slice having four blocks. The slices 212-218 can have boundaries 220-226 in between, shown as solid lines.

Slices can be processed independently of other slices. For example, motion compensation and/or motion estimation can be performed for one slice (e.g., for the blocks in the same slice). In addition, slices can be encoded simultaneously with and/or independently from the other slices. For example, the slices 212-218 can be independently processed, which can increase the efficiency of video encoding. Similarly, the slices can also be independently decoded at a decoder.

Slices of an I-picture can be referred to as I-slices, and slices of a P-picture can be referred to as P-slices. For P-slices, ME and/or MC can be performed between two or more co-located slices in some implementations. As used herein, the term "co-located" refers to two slices in two respective pictures having the same location in the picture. The location of a slice in a picture refers to the relative position of the slice within the picture. The location can be determined using a part of the slice as a reference point. For example, the reference point can be within a block of the slice at the center, a corner, a boundary, or any position of the slice. In some instances, two co-located slices can have the same size and the same shape. For example, for two slices in two pictures having the same size and shape, if the top left corners of the two slices have the same positions (e.g., coordinates) in the picture, the two slices are considered "co-located." For example, the slice 228 of the picture 208 is co-located with the slice 212 of the picture 206, and so on. If the slice 228 is a P-slice, it can use the co-located slice 212 as its reference slice. In some other implementations, for P-slices, ME and/or MC can also be performed between two or more non-co-located slices. For example, if the slice 228 is a P-slice, it can also use the non-co-located slice 214, 216, or 218 as its reference slice.

It should be noted that the slice herein can include any number of any blocks in any configuration, and is not limited to the aforementioned examples (e.g., the slices 212-218). For example, a slice can be in a rectangular shape, such as including blocks of adjacent rows. In another example, a slice can include blocks grouped in a non-contiguous manner, such as two or more non-contiguous block groups. In another example, a part of a first slice can be within a part of a second slice. In yet another example, the first slice can be enclosed by the second slice (e.g., the first slice can be within the second slice).

It should also be noted that the division or segmentation of the slices can be changed or unchanged in the video stream. In other words, the boundaries between the slices can be changed or unchanged. In some implementations, the pictures of the video stream can be divided into slices in the same pattern. In some implementations, the pattern of the slices can change from picture to picture in the video stream.

Figure 3:
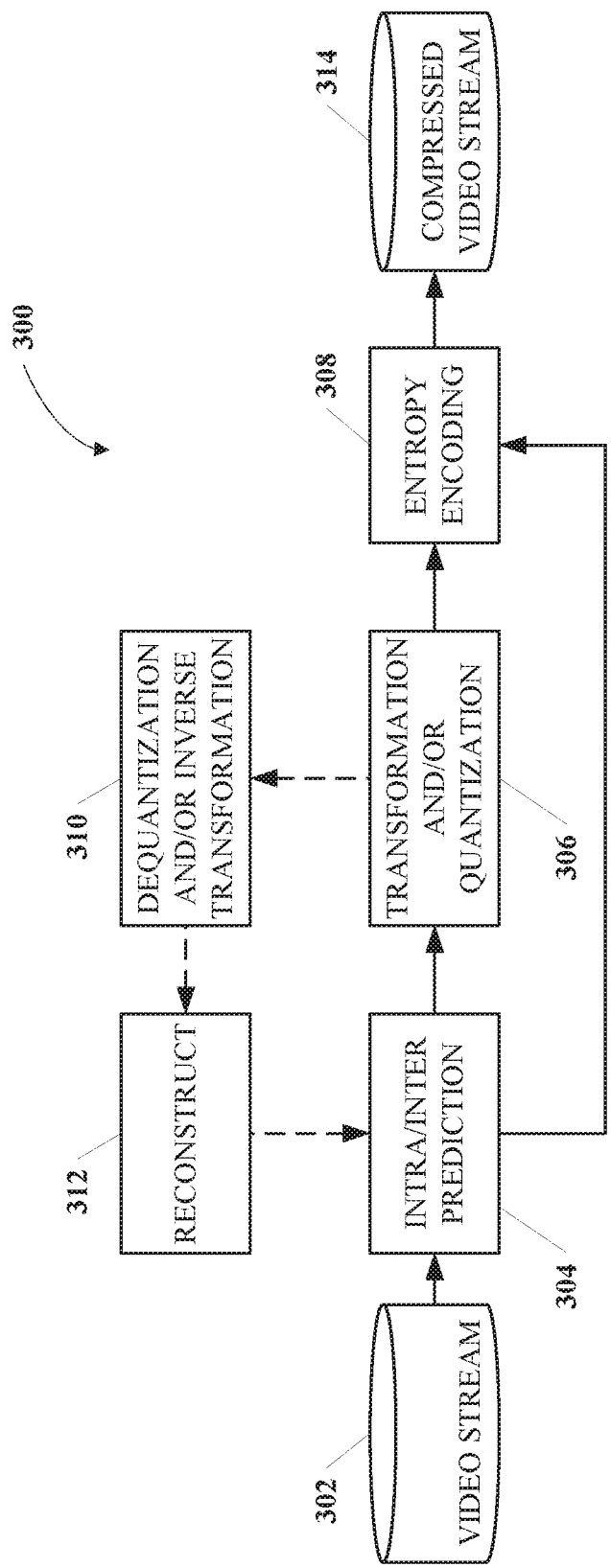
FIG. 3 is a diagram of an example encoding process according to implementations of this disclosure.

FIG. 3 is a flowchart of an example process 300 of encoding a video stream 302 according to implementations of this disclosure. The video stream 302 can include an audio source stream, a video source stream, or any media stream including audio and/or video data. The process 300 can be implemented as software and/or hardware modules in the system 100 in FIG. 1. For example, the process 300 can be implemented as modules included in an encoder (e.g., the apparatus 104 in FIG. 1). The process 300 includes operations 304-308 to produce as output a compressed video stream 314 from a video stream 302. The example encoding process 300 (either the whole process or some stages) can be further modified when implementing dynamic reference picture reconstruction described below in FIGS. 5 and 6. In some instances, process 300 may not be necessary for the implementations of dynamic reference picture reconstruction.

Referring to the process 300 in FIG. 3, the video stream 302 is received by an encoder. The term "receive" used herein can refer to receiving, inputting, acquiring, retrieving, obtaining, reading, accessing, or any action in any manner for inputting information or data. For example, the video stream 302 can be a video stream and include a series of video pictures (e.g., a current picture).

Generally, an encoding process can include one or more of the following stages or operations: a prediction stage (e.g., for intra-prediction or inter-prediction), a transformation stage (with or without quantization), and an entropy encoding stage. The aforementioned stages can be used to output the compressed video stream 314 from the video stream 302 in a forward path of the encoding process as shown by the solid connection lines in FIG. 3: an intra/inter prediction stage 304, a transformation and/or quantization stage 306, and an entropy encoding stage 308.

At the intra/inter prediction stage 304, for intra-prediction, a current block of the current picture can be predicted using previously coded block(s) from the current picture. For inter-prediction, the current block of the current picture can be predicted using previously coded pictures as reference data. Previously coded pictures can include, for example, previously encoded and reconstructed pictures also referred to as reference pictures. For example, motion estimation and compensation can be performed using the current picture and one or more reference pictures to generate motion data. A residual, which is the difference between a predicted block and the current block, can be further transformed, quantized, and/or entropy encoded.

In some implementations, optionally, a loop filter (not shown) can be additionally applied before the entropy encoding stage 308. The loop filter can reduce distortion (e.g., blocking artifacts) introduced by the video compression. Other information used to decode the resulted video bitstream can also be entropy encoded, such as the prediction mode, transformation type, quantization level, and loop filter parameters (e.g., filter strength).

In some implementations, the process 300 can further include a reconstruction path for reconstructing reference data to be used for predicting a future picture. For example, the reconstruction path (shown by the dotted connection lines in FIG. 3) can include the following stages: a dequantization and/or inverse transformation stage 310 and a reconstruction stage 312. The stages 310 and 312 can be used to ensure that both the encoder (e.g., the apparatus 104 in FIG. 1) and a decoder (e.g., the apparatus 102 in FIG. 1) can use the same reference data for prediction. In some implementations, optionally, a loop filter (not shown) can be additionally applied after the stage 312. In other implementations, the reconstructed picture can be used without using the loop filter. The reconstruction can be similar to a reconstruction stage in a decoding process (e.g., stage 410 in FIG. 4).

It should be noted that other variations of the encoding process can be used to encode the video sequence. The encoding process can be performed in different orders, combined into fewer stages, and/or divided into more stages. For example, quantization or transform can be optional in some implementations. As an example, a non-transform based encoder can quantize the residual data without transformation.

Figure 4:
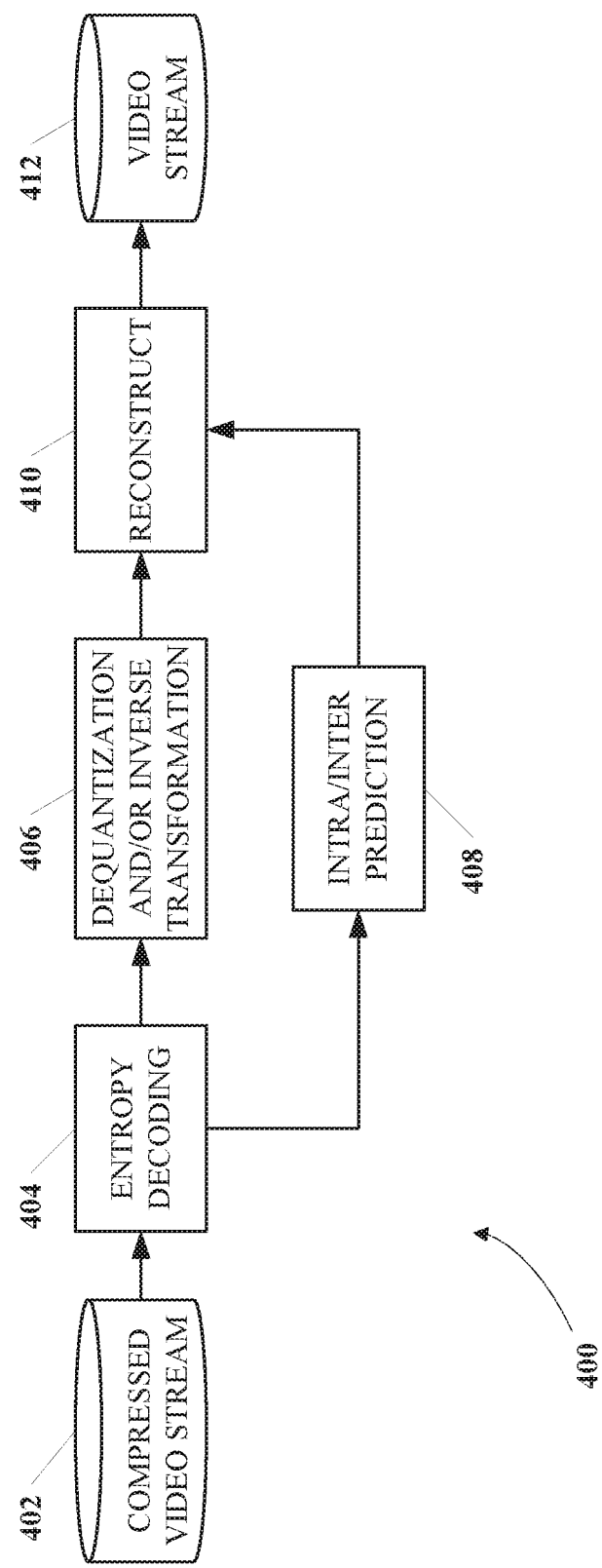
FIG. 4 is a diagram of an example decoding process according to implementations of this disclosure.

FIG. 4 is a diagram of an example process 400 that can be used to decode a compressed video stream according to implementations of this disclosure. The process 400 can be implemented as software and/or hardware modules in the system 100 in FIG. 1. For example, some or all stages of the process 400 can be implemented as software or hardware modules included in the system 100 by a decoder (e.g., the apparatus 102). The decoder can be implemented by program codes stored in memory (e.g., the memory 110). The program codes can include computer-readable instructions that, when executed by a processor (e.g., the processor 108), cause the decoder to decode a compressed video stream in the manner described in FIG. 4. The decoder can also be implemented as specialized hardware included in an apparatus (e.g., the apparatus 102). For example, the decoder can be a hardware decoder. The process 400 includes operations 404-410 to reconstruct a video stream 412 from a compressed video stream 402. In addition, the example process 400 (either the whole process or some stages) can be modified when implementing dynamic reference picture reconstruction of FIGS. 5-6 described below.

Generally, when decoding a compressed media stream, the decoding process is similar to the reconstruction path of the video encoding process. The process 400, similar to the reconstruction path of the process 300 discussed above, can include the following stages: an entropy decoding stage 404, a dequantization and/or inverse transformation stage 406, an intra/inter prediction stage 408, and a reconstruction stage 410. The reconstructed picture can be used as future reference data for processing a future picture successive to the current picture. In addition to be outputted in the media stream 412, the reconstructed picture can also be stored in a buffer (e.g., in the memory 110 in FIG. 1) to be used as the future reference data. In some implementations, the reconstructed picture can be filtered using a loop filter (not shown). Other structural variations of the process 400 can be used to decode the compressed video stream 402.

Figure 5:
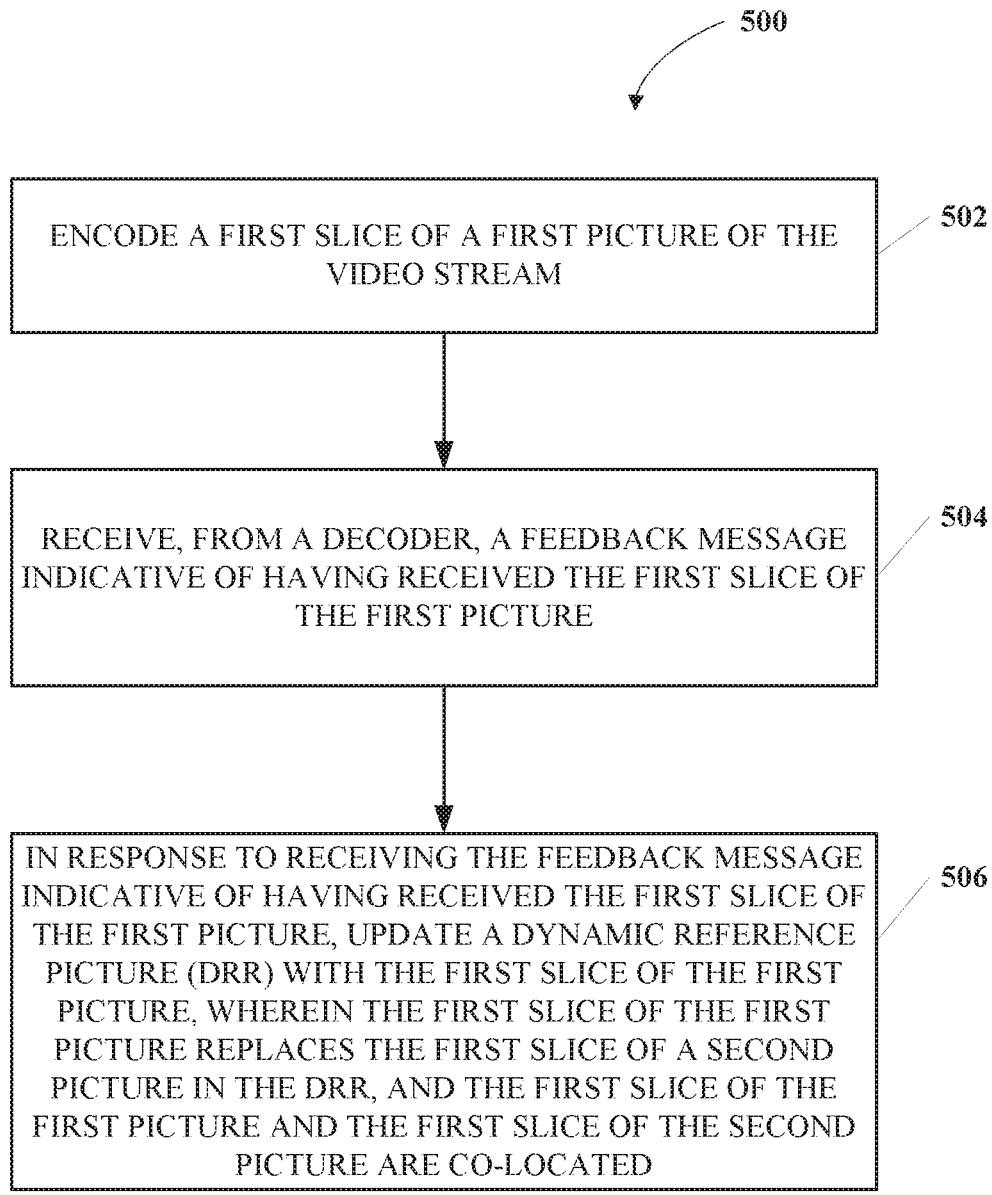
FIG. 5 is a flowchart of an example process for decoding an encoded video stream using dynamic reference picture reconstruction according to implementations of this disclosure.

FIG. 5 is a flowchart of an example process 500 for encoding a video stream using dynamic reference picture reconstruction according to implementations of this disclosure. The process 500 can be implemented as software and/or hardware modules in the system 100 in FIG. 1. For example, the process 500 can be implemented as software modules stored in the memory 118 as instructions and/or data executable by the processor 116 of an encoder, such as the apparatus 104 in FIG. 1. In another example, the process 500 can be implemented in hardware as a specialized chip storing instructions executable by the specialized chip. Some or all of the operations of the process 500 can be implemented at one or more stages of the process 300 in FIG. 3.

At an operation 502, a first slice of a first picture of the video stream is encoded. The encoded slice is transmitted in the compressed video stream and received by a decoder, such as the apparatus 102 in FIG. 1. For example, the first slice can be associated with a slice number and will be referred to herein with the slice number (e.g., a slice "S0") along with the picture that the slice belongs to (e.g., picture P(i+1) in FIG. 7).

Based on a determination that all data required for decoding the first slice of the first picture has been received, the decoder sends a feedback message indicative of having received the first slice of the first picture to the encoder, the process of which will be discussed in detail below in FIG. 6. For example, slice "S0" of the picture P(i+1) is encoded and transmitted in the compressed video stream ("bitstream"). When the slice "S0" is received by the decoder, the decoder sends a feedback message to the encoder indicative of having received slice "S0" of the picture P(i+1).

At an operation 504, a feedback message indicative of having received the first slice of the first picture is received from the decoder. As an example, the feedback message can be, for example, the feedback message indicative of having received slice "S0" of the picture P(i+1).

At an operation 506, in response to receiving the feedback message indicative of having received the first slice of the first picture, a dynamic reference picture (DRR) is updated with the first slice of the first picture. Before updating, the DRR can include a first slice of a second picture, which is typically older than the first picture. The DRR can be updated by using the first slice of the first picture to replace the first slice of the second picture in the DRR. The first slice of the first picture and the first slice of the second picture are co-located.

Slices with the same labels are co-located. For example, slices labeled "S0" are co-located. Similarly, slices labeled "S2" are co-located. For example, the slice "S0" of picture P(i+1) and the slice "S0" of picture P(i+2) are co-located. For example, referring back to FIG. 2, define the slice 212 as slice "S0" of the picture 206, and the slice 228 as slice "S0" of the picture 208. The slices 212 and 228 are co-located.

Updating the DRR with the first slice of the first picture can include, for example, decoding the first slice of the first picture after encoding the first slice of the first picture, and updating the DRR with the first slice of the first picture decoded after encoding.

The updated DRR can be used for encoding a third picture of the video stream, which is encoded later in time than the first picture and after receiving the feedback message indicative of having received the first slice of the first picture. For example, in response to receiving the feedback message indicative of having received the slice "S0" of the picture P(i+1), the DRR can be updated by using the slice "S0" of the picture P(i+1) to replace an earlier slice "S0" of the picture Pi, for example. The updated DRR can be used for encoding subsequent pictures, such as a picture P(i+5) in FIG. 7. By updating the DRR at the slice level, once a slice is confirmed at the encoder that it has been received by the decoder, the DRR can be updated to include the most recent slice, which can increase the correlation between the DRR and future pictures, even in the cases when only portions of a picture are received by the decoder. Using the dynamic reference picture reconstruction thus makes the decoding process more resilient of packet loss.

In some implementations, the third picture of the video stream encoded with reference to the DRR updated with the first slice of the first picture further includes encoding a slice header or supplemental enhancement information (SEI) of the third picture with reference to the DRR updated with the first slice of the first picture. For example, when the encoder receives the feedback message at time T=4 in FIG. 7, the DRR updated with the slice "S0" of the picture P(i+1) can be used as reference to encode the picture P(i+5), and the reference information can be carried in the slice header or SEI of the picture P(i+5). For example, the reference information can include the slice indices (e.g., the slice with index "S0") and the reference picture number (e.g., a picture with number "i+1").

In some implementations, reference pictures used for predicting the third picture further include a picture encoded and decoded immediately prior to encoding the third picture (e.g., "last" picture). For example, the "last" picture can be encoded and then decoded using the reconstruction path in FIG. 3 so that the encoder and the decoder can use the same reference picture reconstructed from the encoded video stream. As an example, the reference picture for predicting the third picture can be selected from the updated DRR and the last picture. For example, when the network condition is good (therefore little to no packet loss), the last picture can be used as reference. When the network condition turns bad, causing more packet loss, a lost slice or picture can cause the subsequent decoding to be broken when the "last" picture is used as reference. In some other implementations, the DRR is used as the reference picture without the option of using the last picture.

In some implementations, a first slice of the third picture of the video stream can be encoded with reference to the DRR updated with the first slice of the first picture, wherein the first slice of the first picture and the first slice of the third picture are co-located.

In some implementations, the feedback message is indicative of having received the first slice and at least one other slice of the first picture. This occurs when multiple slices from the same picture are received by the decoder and one feedback message acknowledging all received slices is sent by the decoder. This will lower transmission and processing costs, but will increase the latency for updating the reference slices/pictures, as the decoder will have to wait longer for all the slices to arrive before sending the feedback message. When the feedback message is indicative of having received multiple slices of the first picture, the DRR is updated with the multiple slices at the same time.

In some other implementations, a second feedback message indicative of having received the second slice of the first picture will be sent for each new slice received from the first picture.

In some implementations, one encoder corresponds to multiple decoders in multicast scenarios. The multiple decoders are required to reconstruct the same DRR. Therefore, the encoder can update the DRR with a common slice of the first picture based on a determination that all feedback messages have been received from each of the multiple decoders associated with the encoder, and each feedback message is indicative of having received a common slice of the first picture. For example, when the common slice is the slice "S0" of the picture P(i+1), after the encoder receives the feedback messages from all corresponding decoders that the slice "S0" of the picture P(i+1) has been received, the DRR can be updated accordingly.

Figure 6:
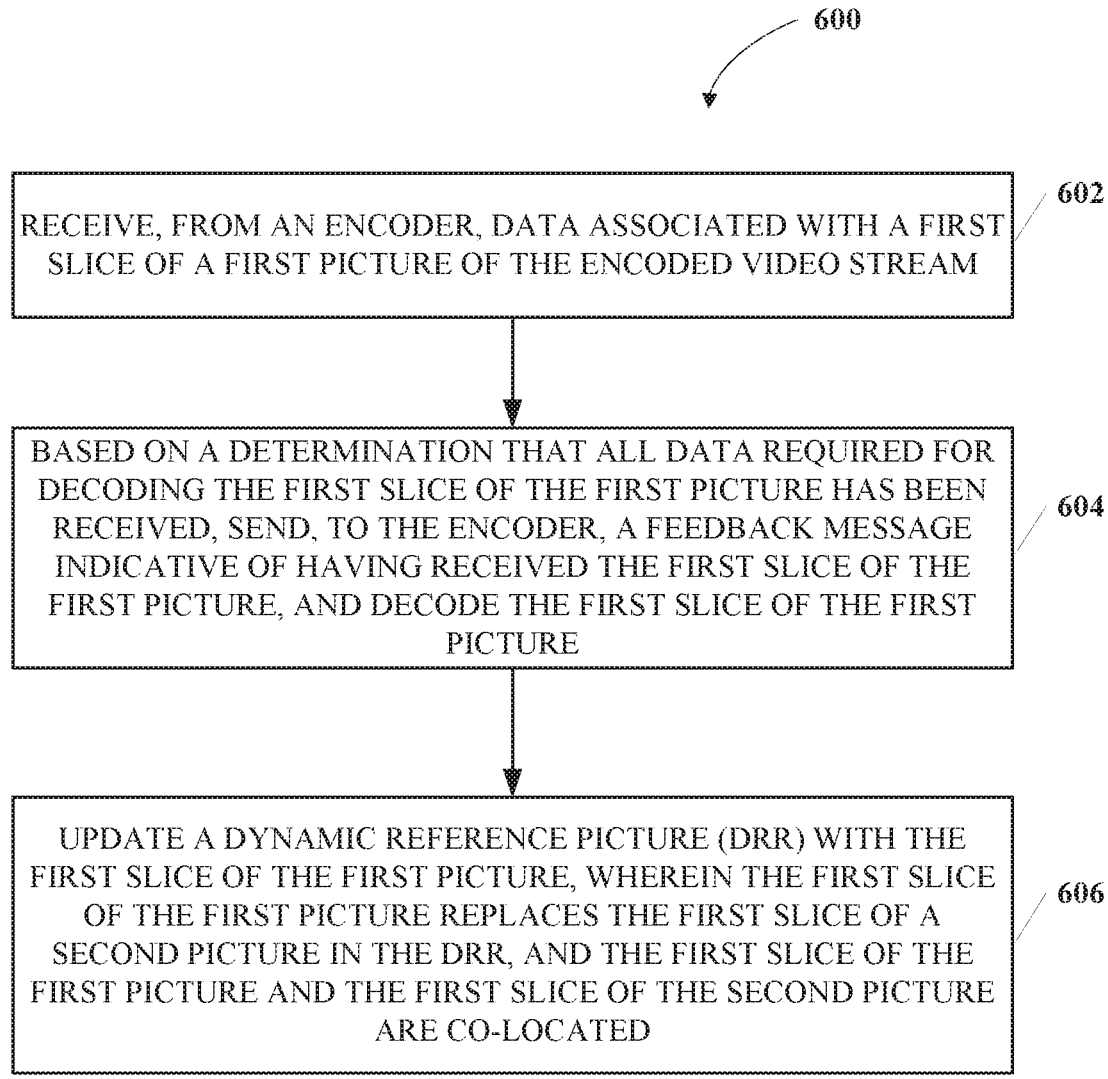
FIG. 6 is a flowchart of an example process for encoding a video stream using dynamic reference picture reconstruction according to implementations of this disclosure.

FIG. 6 is a flowchart of an example process 600 of decoding a compressed video stream using dynamic reference picture reconstruction according to implementations of this disclosure. The compressed video stream can be received in the format of a video bitstream. The process 600 can be implemented as software and/or hardware modules in the system 100 in FIG. 1. For example, the process 600 can be implemented as modules included in a decoder (e.g., the apparatus 102 in FIG. 1). The operations of the process 600 can also be implemented as machine-readable instructions at, for example, at one or more stages of the process 400 in FIG. 4. The process 600 includes operations 602-606 for dynamic reference picture reconstruction from the received video stream, which are set forth as follows.

At an operation 602, data associated with a first slice of a first picture of the encoded video stream is received from an encoder. For example, data associated with the slice "S0" of a picture P(i+1) is received from the encoder.

At an operation 604, based on a determination that all data required for decoding the first slice of the first picture has been received, a feedback message indicative of having received the first slice of the first picture is sent to the encoder. And the first slice of the first picture is decoded. For example, upon determining that all data required for decoding the slice "S0" has been received, the decoder sends a feedback message to the encoder indicative of having received slice "S0" of the picture P(i+1). For example, the slice can arrive in one packet or multiple packets.

In addition to sending the feedback message, the decoder decodes the first slice of the first picture based on the received data. A slice can be decoded using reference to other pictures, such as the reference picture[s] discussed above. For example, the slice "S0" of the picture P(i+1) can be decoded using the DRR. In some implementations, the reference picture[s] can also include the "last" picture in the sequence decoded immediately prior to decoding the first picture.

At an operation 606, a dynamic reference picture (DRR) is updated with the first slice of the first picture, wherein the first slice of the first picture replaces the first slice of a second picture in the dynamic reference picture, and the first slice of the first picture and the first slice of the second picture are co-located. Updating the DRR can include, for example, decoding the first slice of the first picture from the encoded video stream, and updating the DRR with the first slice of the first picture decoded from the encoded video stream.

The timing for updating the DRR can vary depending on the implementations. For example, in some implementations, after the first slice of the first picture is decoded, it may not be used to update the DRR immediately. The encoder will tell when to use it, for example, by passing the reference information in the slice header or SEI of a new picture. In one example, the encoder can include the reference information in the slice header or SEI of the picture P(i+5) in FIG. 7. Consequently, the decoder will be able to reconstruct the new DRR when decoding the picture P(i+5). Before that, the old DRR is valid to use.

Next, the decoder can receive, from the encoder, data associated with a third picture of the encoded video stream with reference to the DRR updated with the first slice of the first picture. The third picture is decoded later in time than the first picture. The reference information can be decoded from a slice header or supplemental enhancement information (SEI) of the third picture. Based on the reference information, the decoder can decode the third picture with reference to the DRR updated with the first slice of the first picture. As discussed above, for example, the DRR can be updated when decoding the third picture, wherein the slice header or SEI of the third picture contains the reference information of the first slice of the first picture, which is used to update the DRR at the decoder.

Without repeating every detail, the reference pictures can be updated similar to the process 500 in FIG. 5. For example, in some implementations, a reference picture for predicting the third picture can be selected from a picture decoded immediately prior to the third picture ("last" picture), and the DRR updated with the first slice of the first picture. In some other implementations, the DRR is used as the reference picture without using the "last" picture.

In some implementations, the feedback message is indicative of having received the first slice and at least one other slice of the first picture. In some other implementations, as soon as receiving a slice, a feedback message is sent.

In some implementations, the feedback message indicative of having received the first slice of the first picture is indicative of having received the first slice and at least one other slice of the first picture. The DRR can be updated with the first slice and the at least one other slice of the first picture at the same time.

Figure 7:
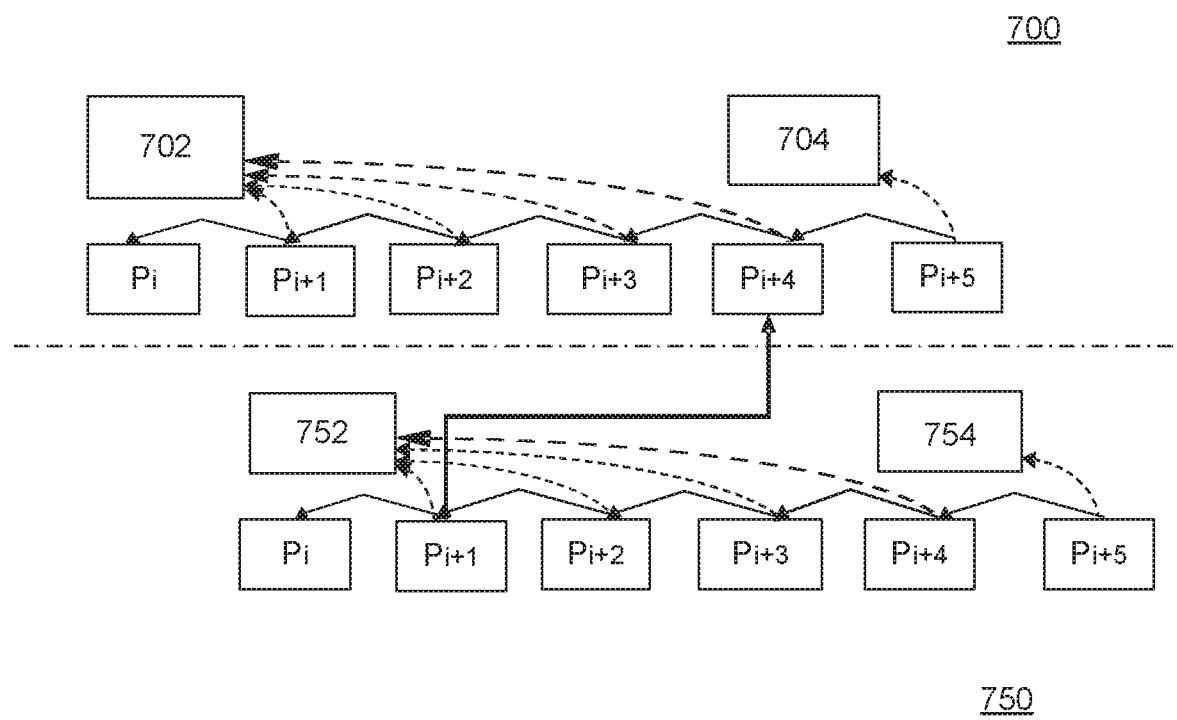
FIG. 7 is an example of dynamic reference picture reconstruction according to implementations of this disclosure.

FIG. 7 is an example of dynamic reference picture reconstruction according to implementations of this disclosure. In this example, the process is shown in a timing point of view from left to right.

At a decoder 750, after decoding a picture Pi at time t1, the picture Pi and a dynamic reference picture DRR(t1) 752 at time t1 can be used as references. The corresponding DRR at an encoder 700 is shown as DRR(t1) 702. Assume that the first slice received after the picture Pi, denoted as slice K, belongs to a picture P(i+T) with T>=1. In this example, T=1, which means that the slice K belongs to picture P(i+1). The slice K is decoded using the current reference pictures, such as DRR(t1) 752 and optionally the "last" picture Pi. Meanwhile, a feedback message signaling "slice K is received" is sent to the encoder 700. Depending on the network condition, it can take some time for the feedback message to arrive at the encoder 700.

The feedback message arrives the encoder 700, for example, during encoding of a picture P(i+N), which occurs later in time than P(i+T). In this example, the feedback message arrives during encoding of a picture P(i+4) with N=4, which occurs later in time than the picture P(i+1). Upon arrival of the feedback message, the DRR can be updated at time t2 to include the slice K from the picture P(i+T). In this example, T=1. The updated DRR(t2) 704 can be used as references for encoding a future picture, such as picture P(i+N+1). In this example where N=4, DRR(t2) 704 can be used as a reference starting from a new picture P(i+5).

As discussed above, information of the reference picture(s) can be carried in the slice header or the SEI. In this example, when a slice in the new picture P(i+5) is encoded with the updated DRR(t2), e.g., DRR(t2) 704, which is updated with the slice K in the picture P(i+1), such information can be carried in the slice header or the SEI. Upon receiving information in the slice header indicating that the DRR(t2) 704 is used as reference, the decoder 750 can start using the corresponding DRR, which is updated to include the slice K in the picture P(i+1). The updated DRR, e.g., DRR(t2) 754, can be used as references to decode pictures starting from P(i+N+1), e.g., picture P(i+5) in the illustrative example.

In some implementations, such as when only the DRR is used as reference, any lost slices, such as slices in the pictures P(i+2), P(i+3) or P(i+4), will not affect the decoding of the next picture P(i+5). The decoder will recover from packet loss of slices in P(i+2), P(i+3) or P(i+4).

In some implementations, instead of sending the feedback message right away when a slice is received, the decoder 750 can wait (subject to certain latency limit) until all slices have been received for a certain picture before sending the feedback message. This can mean more delay as the slices would not arrive at the same time. On the other hand, fewer feedback messages are sent (only one per picture), which lowers the transmission and processing cost.

In some implementations, more than one decoder corresponds to one encoder, e.g., in a multicast scenario. The encoder can determine whether feedback messages have been received for a common slice from all of the decoders. If so, the DRR is updated with the common slice. The information of the common slice can be carried in the slice header or the SEI. For example, when the packet loss rate is 10%, for a 1:4 multicast (one encoder, four decoders), the probability of a slice being received by all four decoders is 66%. When the packet loss rate drops to 20%, the probability drops to 41%. In another example, for a 1:16 multicast (one encoder, sixteen decoders), the probability of a slice being received by all sixteen decoders is 19% when the packet loss rate is 10%, and 2.8% when the packet loss rate is 20%.

Furthermore, when some decoders are broken, such as when all packets of some key pictures are lost, the processes described above can be carried out in the other decoders that are still running. Meanwhile, the broken decoders can be recovered when a new immediate direct fresh (IDR) picture is received.

As described above, a person skilled in the art should be noted that, all or a portion of aspects of the disclosure described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing, either singly or in combination. The terms "signal" and "data" are used interchangeably. Further, portions of the computing devices do not necessarily have to be implemented in the same manner.

The aspects herein can be described in terms of functional block components and various processing operations. The disclosed processes and sequences may be performed alone or in any combination. Functional blocks can be realized by any number of hardware and/or software components that perform the specified functions. For example, the described aspects can employ various integrated circuit components, e.g., memory elements, processing elements, logic elements, look-up tables, and the like, which can carry out a variety of functions under the control of one or more microprocessors or other control devices. Similarly, where the elements of the described aspects are implemented using software programming or software elements the disclosure can be implemented with any programming or scripting language such as C, C++, Java, assembler, or the like, with the various algorithms being implemented with any combination of data structures, objects, processes, routines or other programming elements. Functional aspects can be implemented in algorithms that execute on one or more processors. Furthermore, the aspects of the disclosure could employ any number of conventional techniques for electronics configuration, signal processing and/or control, data processing and the like. The words "mechanism" and "element" are used broadly and are not limited to mechanical or physical implementations or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained in the apparatus, but is one that can be accessed remotely by the apparatus, and does not have to be contiguous with other memory that might be physically contained in the apparatus.

Any of the individual or combined functions described herein as being performed as examples of the disclosure can be implemented using machine readable instructions in the form of code for operation of any or any combination of the aforementioned hardware. The computational codes can be implemented in the form of one or more modules by which individual or combined functions can be performed as a computational tool, the input and output data of each module being passed to/from one or more further module during operation of the methods and systems described herein.

Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The particular aspects shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an aspect" or "one aspect" throughout is not intended to mean the same implementation or aspect unless described as such.

The use of "including" or "having" and variations thereof herein is meant to encompass the items listed thereafter and equivalents thereof as well as additional items. Unless specified or limited otherwise, the terms "mounted," "connected," 'supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the disclosure (especially in the context of the following claims) should be construed to cover both the singular and the plural. Furthermore, recitation of ranges of values herein is merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of examples, or exemplary language (e.g., "such as") provided herein, is intended merely to better illuminate the disclosure and does not pose a limitation on the scope of the disclosure unless otherwise claimed.

This specification has been set forth with various headings and subheadings. These are included to enhance readability and ease the process of finding and referencing material in the specification. These heading and subheadings are not intended, and should not be used, to affect the interpretation of the claims or limit claim scope in any way. The particular implementations shown and described herein are illustrative examples of the disclosure and are not intended to otherwise limit the scope of the disclosure in any way.

All references, including publications, patent applications, and patents, cited herein are hereby incorporated by reference to the same extent as if each reference were individually and specifically indicated as incorporated by reference and were set forth in its entirety herein.

While the disclosure has been described in connection with certain embodiments and implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for encoding a video stream, comprising:
    encoding, by a processor, a first slice of a first picture of the video stream;
    receiving, from a decoder, a feedback message indicative of having received the first slice of the first picture; and
    in response to receiving the feedback message indicative of having received the first slice of the first picture, updating a dynamic reference picture (DRR) with the first slice of the first picture, wherein the DRR is dynamically reconstructed by the encoder from multiple pictures comprising a second picture and at least one other picture, and the DRR is updated by replacing a co-located slice of the second picture comprised in the DRR with the first slice of the first picture.

2. The method of claim 1, further comprising:
    encoding, by the processor, a third picture of the video stream with reference to the DRR updated with the first slice of the first picture, wherein the third picture is encoded after receiving the feedback message indicative of having received the first slice of the first picture.

3. The method of claim 2, wherein encoding, by the processor, the third picture of the video stream with reference to the DRR updated with the first slice of the first picture further comprises:
    encoding a slice header of the third picture with reference to the DRR updated with the first slice of the first picture.

4. The method of claim 2, wherein encoding, by the processor, the third picture of the video stream with reference to the DRR updated with the first slice of the first picture further comprises:
    encoding supplemental enhancement information (SEI) of the third picture with reference to the DRR updated with the first slice of the first picture.

5. The method of claim 2, wherein a reference picture for predicting the third picture is selected from: a picture encoded and decoded immediately prior to the third picture, and the DRR updated with the first slice of the first picture.

6. The method of claim 1, wherein updating the DRR with the first slice of the first picture comprises:
decoding the first slice of the first picture after encoding the first slice of the first picture; and
updating the DRR with the first slice of the first picture decoded after encoding.

7. The method of claim 1, wherein the feedback message indicative of having received the first slice of the first picture is indicative of having received the first slice and at least one other slice of the first picture, and wherein updating the DRR with the first slice of the first picture comprises:
updating the DRR with the first slice and the at least one other slice of the first picture at the same time.

8. The method of claim 1, wherein in response to receiving the feedback message indicative of having received the first slice of the first picture, updating the dynamic reference picture (DRR) with the first slice of the first picture comprises:
updating the DRR with the first slice of the first picture based on a determination that all feedback messages have been received from each of a plurality of decoders associated with an encoder implementing the method, wherein each feedback message is indicative of having received the first slice of the first picture.

9. A method for decoding an encoded video stream, comprising:
receiving, from an encoder, data associated with a first slice of a first picture of the encoded video stream;
based on a determination that all data required for decoding the first slice of the first picture has been received, sending, to the encoder, a feedback message indicative of having received the first slice of the first picture, and decoding, by a processor, the first slice of the first picture; and
updating a dynamic reference picture (DRR) with the first slice of the first picture, wherein the DRR is dynamically reconstructed by the decoder from multiple pictures comprising a second picture and at least one other picture, and the DRR is updated by replacing a co-located slice of the second picture comprised in the DRR with the first slice of the first picture.

10. The method of claim 9, further comprising:
receiving, from the encoder, data associated with a third picture of the encoded video stream with reference to the DRR updated with the first slice of the first picture; and
decoding the third picture with reference to the DRR updated with the first slice of the first picture.

11. The method of claim 10, wherein decoding the third picture with reference to the DRR updated with the first slice of the first picture comprises:
decoding a slice header of the third picture with reference to the DRR updated with the first slice of the first picture.

12. The method of claim 10, wherein decoding the third picture with reference to the DRR updated with the first slice of the first picture comprises:
decoding supplemental enhancement information (SEI) of the third picture with reference to the DRR updated with the first slice of the first picture.

13. The method of claim 10, wherein a reference picture for predicting the third picture is selected from: a picture decoded immediately prior to the third picture, and the DRR updated with the first slice of the first picture.

14. The method of claim 10, wherein updating the DRR with the first slice of the first picture comprises:
decoding the first slice of the first picture from the encoded video stream; and
updating the DRR with the first slice of the first picture decoded from the encoded video stream.

15. The method of claim 9, wherein the feedback message indicative of having received the first slice of the first picture is indicative of having received the first slice and at least one other slice of the first picture, and wherein updating the DRR with the first slice of the first picture comprises:
updating the DRR with the first slice and the at least one other slice of the first picture at the same time.

16. An apparatus for decoding an encoded video stream, comprising:
a non-transitory memory; and
a processor, wherein the non-transitory memory includes instructions executable by the processor to:
receive, from an encoder, data associated with a first slice of a first picture of the encoded video stream;
based on a determination that all data required for decoding the first slice of the first picture has been received, send, to the encoder, a feedback message indicative of having received the first slice of the first picture, and decode the first slice of the first picture from the encoded video stream; and
update a dynamic reference picture (DRR) with the first slice of the first picture, wherein the DRR is dynamically reconstructed by the decoder from multiple pictures comprising a second picture and at least one other picture, and the DRR is updated by replacing a co-located slice of the second picture comprised in the DRR with the first slice of the first picture.

17. The apparatus of claim 16, wherein the instructions executable by the processor further comprise instructions to:
receive, from the encoder, data associated with a third picture of the encoded video stream with reference to the DRR updated with the first slice of the first picture; and
decode the third picture with reference to the DRR updated with the first slice of the first picture.

18. The apparatus of claim 17, wherein the instructions to decode the third picture with reference to the DRR updated with the first slice of the first picture comprise instructions to decode one of:
a slice header of the third picture with reference to the DRR updated with the first slice of the first picture; and
supplemental enhancement information (SEI) of the third picture with reference to the DRR updated with the first slice of the first picture.

19. The apparatus of claim 17, wherein a reference picture for predicting the third picture is selected from: a picture decoded immediately prior to the third picture, and the DRR updated with the first slice of the first picture.

20. The apparatus of claim 16, wherein the instructions to update the DRR with the first slice of the first picture comprise instructions to:
decode the first slice of the first picture from the encoded video stream; and
update the DRR with the first slice of the first picture decoded from the encoded video stream.

* * * * *